Oct. 6, 1942. W. H. GREEN Re. 22,194

LIQUID TREATING PROCESS AND APPARATUS

Original Filed June 2, 1938

INVENTOR.
Walter H. Green,
BY Cromwell, Frisby & Warden
ATTORNEYS.

Reissued Oct. 6, 1942

Re. 22,194

UNITED STATES PATENT OFFICE 22,194

LIQUID TREATING PROCESS AND APPARATUS

Walter H. Green, Batavia, Ill., assignor to Infilco Incorporated, Chicago, Ill., a corporation of Delaware Original No. 2,245,583, dated June 17, 1941, Serial No. 211,362, June 2, 1938. Application for reissue August 25, 1941, Serial No. 408,236

20 Claims. (Cl. 210—16)

This invention relates to a method and apparatus for removal of substances in solid form from liquids, the process having principal applications in the softening, clarification and stabilization of water. The process involves the continuous formation, conditioning and removal of precipitates by establishing in a body of the liquid to be treated a mixing and reaction zone and a clarification zone and providing an improved type of circulation pattern which includes the re-use of solids separated from previously treated liquids.

A principal object of the invention is the treatment of water containing hardness-imparting substances such as calcium and magnesium by effecting a reaction for the formation of solids in the presence of previously separated solids which are maintained in a state of suspension and substantially unitary rotation and passing water from the mixing and reaction zone uniformly upwardly through vertical baffles which prevent the rotation of the reaction zone from extending therebetween.

Another object of the invention is the softening of water in a vertical tank in which there is provided in the bottom portion of the tank a means for maintaining a suspension comprised of water undergoing treatment and suspended solids separated from previously treated water and in the upper portion of the tank there are provided upright baffles to form relatively quiescent separation or clarification zones.

A still further object of this invention is the provision of a water softening process in which there is established and maintained in the lower portion of a tank a body of water containing crystalline particles of hardness-imparting constituents separated from previously treated water, the softening reaction being effected in the presence of these previously precipitated solids while the body of water is maintained in a state of unitary rotation, the water being displaced upwardly from the zone of rotation at a substantially even rate of flow into zones of relative quiescence.

A further and special object of the invention is to provide special means for reducing the solids content of water containing a suspension of precipitated solids, there being involved an auxiliary chamber providing a space open to the slurry and of such quiescence as to permit settling of solids into the space to provide a concentration thereof.

Figure 2:
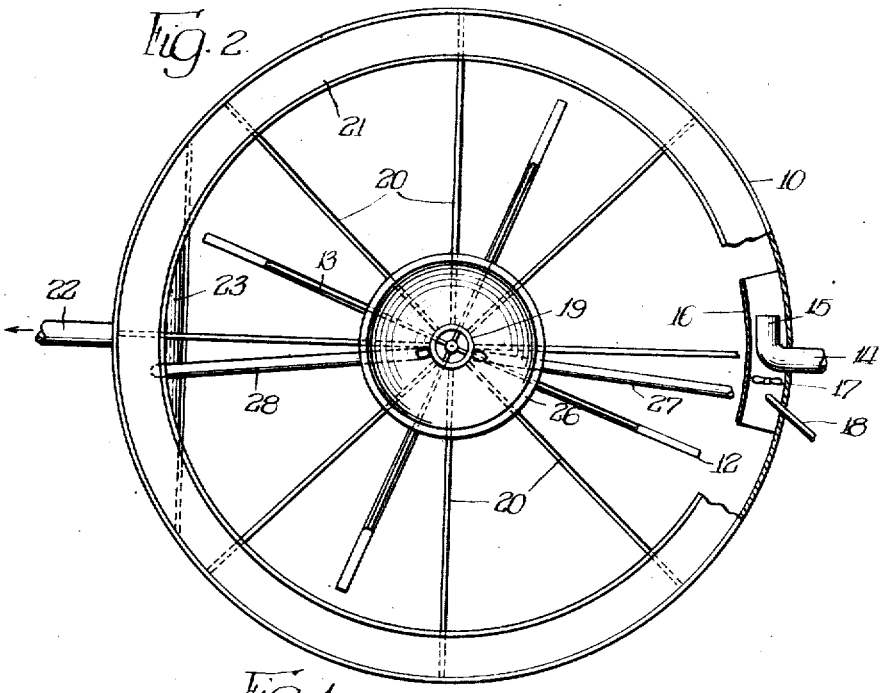
Figure 1:
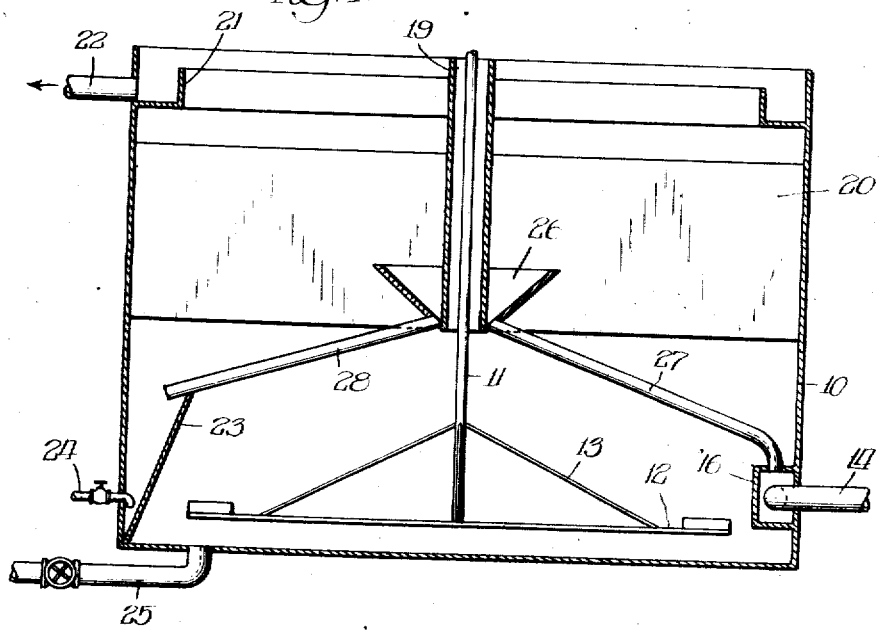

These and further objects will be understood upon a consideration of the following description of a preferred embodiment of the invention and by reference to the accompanying drawing, in which Fig. 1 is a vertical section of apparatus constructed in accordance with the invention; and Fig. 2 is a top view, partly in section, of the embodiment shown in Fig. 1.

Heretofore it has been suggested to soften and clarify water by producing the softening reaction in part at least in a body of water to which is imparted rotary motion, the treated water being displaced upwardly into an expanding separation zone for clarification purposes. This general type of softening process is described in my prior patent, No. 1,702,257, issued February 19, 1929, and again in Spaulding Patent No. 2,021,672, issued November 19, 1935. The process as practiced heretofore has certain objections which are eliminated in accordance with the present invention.

In the apparatus shown in the drawing there is provided a treating tank 10 which may be of cylindrical construction. There is provided a vertical shaft 11 mounted centrally of the tank 10, the shaft having agitator blades 12 extending horizontally adjacent the lower portion of the tank. Supporting wires or rods 13 may be used to assist in holding up the agitator blades 12.

Raw water to be treated is introduced into the tank adjacent the bottom thereof through line 14. The raw water inlet line is provided with a discharge section 15 which is turned along the side of the tank in the direction of rotation of the paddle 12. Surrounding the discharge section of the raw water inlet line is an open-ended casing 16 which is spaced from the discharge section so that slurry in the bottom of the tank can pass through the open end of the casing and be mixed with raw water entering the tank. The provision of a casing in this manner accentuates the jet-like effect of the discharge of raw water into the tank and causes a definite admixture of the raw water with slurry previously formed in the tank.

In Fig. 2 there will be seen a stream projecting impeller 17 which is operative to increase the stream of slurry circulated through the sleeve 16 to be mixed with the raw water. A chemical feed line is shown at 18, this line discharging in front of the impeller 17 so that the chemicals are projected through the sleeve 16 and mixed with circulated slurry before contact of the slurry with the raw water.

The tank also is provided with a central sleeve 19 surrounding the shaft 11 and terminating somewhat above the bottom of the tank. Between the sleeve 19 and the wall of the tank extend a series of radial baffles 20 which are positioned vertically in the tank and extend downwardly therein to a plane spaced substantially above the bottom of the tank, as shown in Fig. 1.

Above the baffles 20 there is an annular weir 21 attached to and extending around the inner side of the tank and providing an overflow outlet for water rising in the tank. An outlet line 22 communicates with the tank adjacent weir 21 and provides a discharge line for water from the tank.

In the lower part of the tank there is provided an upstanding angularly disposed partition member 23. Adjacent the bottom of the partition there is positioned a draw-off line 24 through which liquid between the partition 23 and the walls of the tank can be withdrawn.

There also is provided a main blow-off line 25 communicating with the bottom of the tank. This line may be used to withdraw slurry from the tank or to discharge the contents of the tank as desired.

Surrounding the shaft cylinder 19 is an open-topped funnel member 26 of truncated conical shape, the base of the cone being positioned against and supported by the cylinder 19. The baffles perferably are provided with triangular cut-out portions which fit around the funnel 26 and provide in the funnel a continuous communication between the plurality of sections formed by the baffles. In the lower portion of the conical member 26 is provided an opening to which is fitted a downwardly extending conduit 28, leading to the compartment between the partition 23 and the tank wall.

The funnel member 26 also has another conduit, indicated at 27, which leads from the lower portion of the funnel to the casing 16 at a point back of the impeller 17. The action of the impeller and the discharge of raw water through line 15 draws liquid from the funnel member 26 through the line 27 and so delivers an additional supply of solids to the incoming water.

In the operation of the process water to be softened is flowed into the tank through the line 14 and chemicals such as lime and soda are introduced through the chemical line 18. The hardness-imparting constituents of the raw water are changed to calcium carbonate and magnesium hydroxide, which under the conditions of the process precipitate out into crystalline particles. The shaft 11 is set in rotation and agitators 12 create in the lower portion of the tank below the baffles 20 a general rotary movement of the water, together with local mixing eddies. This rotary motion is augmented by the jet-like effect of the discharge through section 15. As the water rises in the tank it reaches the level of the lower portion of baffles 20 and continues to rise upwardly between the baffles. The baffles prevent the rotary movement which is maintained in the bottom of the tank from extending above their lower portion and thereby establish a zone of relative quiescence in the upper portion of the tank through which the treated water must pass in reaching the overflow 21. In this zone of quiescence the water has an opportunity to separate from the crystalline particles and to rise to the top of the tank. Separation of the water from the particles results in a concentration of the particles in the tank to build up a relatively thick slurry of suspended crystalline particles. The solids content of the slurry will usually be of the order of 2 to 3 per cent, but it likewise may be considerably more than this figure or less, depending upon such factors as the type of water being treated. In operation this thick suspension or slurry will normally fill the lower part of the tank up to or a little above the top edge of funnel 26.

As the solids concentration in the bottom of the tank builds up there is an increasing amount of solids mixed with the raw water and reactant during the softening reaction. Previously treated water carrying suspended particles passes through the casing 16 and is admixed with the raw water and chemicals and further admixture takes place in the rotating slurry. It is preferred that the chemicals be mixed with the slurry before the slurry contacts the raw water. The softening reaction then occurs in the presence of a relatively large quantity of previously precipitated solids of like nature to those to be formed. The unitary or general state of rotation in the bottom of the tank presents constantly changing portions of the slurry to the raw water and maintains particles in a general state of suspension. By effecting the softening reaction in the presence of the previously precipitated particles, there is obtained a rapid separation in solid form of the calcium carbonate and magnesium hydroxide. Also, there is effected a building up of the crystalline particles into clusters of substantial size which are more readily separated from the water than crystalline particles of the type normally formed upon addition of reagents to the water to be softened. The slurry containing these crystalline clusters expands upwardly in the tank by the displacement occasioned by raw water entering the tank through line 14, and as the mixture passes upwardly into and through the relatively quiescent zones provided by baffles 20 there occurs a separation of clear water since there is no longer sufficient agitation to maintain the solids in the slurry mixture in suspension. Some solids may settle back out of the quiescent zone into the rotating mixture below.

There also is shown in the drawing a particularly effective means for return or recirculation of the crystalline particles to the mixing and reaction zone in the bottom of the tank or discharge to waste. When the top level of the slurry rises above the top edge of the funnel member 26 the particles pass into the space above this funnel member and settle down into it, thereby effecting a concentration of the solids in the lower portion of the funnel 26. As the solids concentrate in the funnel 26 the specific gravity of the slurry in which they are suspended increases and there results a flow downwardly through the line 27, thereby providing a return of the solids to the reaction zone. Instead of returning solids from the skimmer and concentrator 26 to the reaction zone there may be provided a conduit 28 leading from the funnel member 26 to the space behind the partition 23. From this space the particles separated by the funnel member 26 may be discharged to waste. The line 28 need not necessarily discharge into the separation space provided by the partition 23, but may pass directly through the wall of the tank and to waste.

The concentrator 26 acts substantially the same regardless of whether the solids are discharged through line 27 back to the casing 16 in the reaction zone or through line 28 to waste, and may be utilized to determine the upper level of slurry in the tank. The concentration of slurry effected when the discharge from funnel 26 is to waste results in a saving in the amount of treated water passing to waste.

Where the return of solids from the funnel 26 is to casing 16 there is a concentration of solids in the reaction zone. During the first part of the process and until the concentration of solids in the reaction zone has reached the desired point it is preferred that all of the solids be returned to the reaction zone. The increased specific gravity of the mixture of liquid and solids in the funnel 26 tends to cause a flow through line 27, and this flow is augmented by the action of impeller 17 and the jet effect of the discharge of raw water through the section 15.

The solids content of the slurry in the bottom of the tank is much greater than could be obtained in the treatment of a like quantity of water without concentration of the solids retained from previously treated water, so that a balance between the solids being formed by the treatment of raw water and solids removed from the tank may be effected by withdrawal of a relatively small volume of the slurry in the bottom of the tank as compared with the amount of raw water being treated. The partition member 23 and outlet line 24 can be used to effect a further concentration of the solids and a reduction in the amount of water necessarily blown off to waste to remove solids from the reaction zone. The concentration chamber provided by partition 23 has an action somewhat similar to the action of cone 26, in that suspended particles in the slurry tend to settle into the space behind partition 23 where the agitating effect of the paddles 12 does not extend. Thus, there is effected a concentration of the solids in the lower portion of the chamber provided between the wall of the tank and the member 23 and this concentrated slurry may be drawn off through line 24. Partition 23 and funnel member 26 may be made adjustable in their position to change the level of withdrawal of solids from the tank. The funnel member 26 has a skimming action which may be used to fix the upper level of the slurry in the tank.

The general pattern of circulation of liquid in the tank includes the maintenance of a general state of rotation in the reaction zone in which the agitators 12 and the jet effect of the water combine to maintain the particles of the slurry in suspension and to return changing portions of the slurry to the casing 16 to be mixed with the raw water entering the process, water undergoing treatment being mixed and distributed throughout the volume of the rotating slurry and displaced therefrom as above referred to. There is effected a general building up of particle size and when the desired solids concentration of the water has been reached the slurry withdrawal may be adjusted to maintain a balance. Following the general rotary motion in the bottom of the tank the displacement is upwardly into and through the zone of relative quiescence in which the water separates from the crystalline particles, the upflow being at substantially the same velocity throughout the tank. It is not necessary to employ a separate upwardly extending separation zone of the type disclosed in my prior patent and in Spaulding Patent No. 2,021,672. The whole area of the tank may be used for separation of treated water, resulting in increased capacity and saving in space. There also is obtained a more uniform and definite slurry than with my previous patent referred to and this slurry may be more concentrated and of greater volume so that there is better contact of the water undergoing treatment with particles and correspondingly more rapid and better results. Obviously the tank 10 may be extended to form storage space for treated water, as in my previous patent. The crystalline solids from the liquid may be returned directly to the reaction zone to some extent by settling out of the space between the baffles, but the return preferably is through the funnel 26. Line 28 creates a return of particles and in some cases liquid by reason of the increase in specific gravity of the liquid in the funnel due to the concentration of solids. This line may have a branch, not shown, extending into the mixing and reaction zone for direct return of solids thereto. Line 27 provides a positive return of liquid and solids from the funnel 26 which does not depend upon the increase in concentration of solids to effect the return. The impeller 17 and the jet effect of the raw water discharge are sufficient to pull water downwardly through the line 27, thereby effecting a return of liquid containing suspended solids from the zone of separation to the zone of reaction.

It is possible to vary the process and apparatus considerably from the specific embodiments disclosed herein for purposes of illustration and explanation and such changes are intended to be included in the appended claims.

I claim:

1. Apparatus of the type described, comprising a substantially cylindrical tank, an agitator in the bottom the tank, a substantially horizontal open-ended casing in the lower portion of said tank, means for introducing liquid to be treated into said casing, means for introducing a reactant into said casing, and baffle means positioned in said tank above said agitator.

2. Apparatus of the type described, comprising a treating tank, a mechanical agitator in the lower portion of said tank, baffle members positioned above said agitator, a solids separating chamber of substantially less cross-sectional area than the cross-sectional area of the tank positioned adjacent said baffles, said separating chamber having an outlet conduit leading from the lower portion thereof, an inlet means into the lower portion of said tank, and an outlet from the upper portion of said tank.

3. Apparatus of the type described, comprising a treating tank, an open-ended casing in the lower portion of said treating tank, means for introducing liquid to be treated in said casing, means for introducing a reactant into admixture with liquid from said inlet, means for producing a current of liquid from the bottom of said tank through said casing and for producing a rotary action of the liquid in the lower portion of the tank, baffle means spaced upwardly from the bottom of the tank to provide a mixing and reaction zone therebelow, a solids separator adjacent said baffles, and a solids concentrator below said baffles.

4. Apparatus of the type described comprising in combination a substantially flat bottomed treating tank, said tank having means for delivering water to be treated and a treating reagent into the lower portion thereof and treated water discharge means adjacent the top thereof, agitator means for producing a rotary motion of liquid in the lower portion of said tank and over substantially the whole bottom thereof, means comprising baffle members located over said agitator means and of form to still said rotary motion and permit substantially uniform and vertical rise of water over the cross-sectional area of said tank to adjacent the level of said treated water discharge means, a solids separator having an inlet opening adjacent said baffle members and a means to discharge solids to waste from said separator.

5. Water treating apparatus comprising a tank of circular cross-sectional form, means for discharging water to be treated and for delivering treatment reagent into a lower portion of said tank and means for discharging treated water from the upper portion of said tank, baffle means within said tank and serving to divide same into a lower agitating space and an upper quiescent space, said baffle means being of form to permit free upward flow from said agitating space over substantially the whole area thereof and to permit substantially uniform rise of water over each cross-sectional area of the tank from adjacent said agitating space to adjacent the level of said treated liquid discharge, agitator means in said agitator space, a solids separator having an inlet above the lower edge of said baffle means and a discharge to waste from said separator.

6. The apparatus of claim 5 comprising a second solids separator, the inlet of said second separator being at a lower level than that of the first referred to separator.

7. Water treating apparatus comprising a tank of circular cross-sectional form, means for discharging water to be treated and for delivering treatment reagent into a lower portion of said tank and means for discharging treated water from the upper portion of said tank, baffle means within said tank and serving to divide same into a lower agitating space and an upper quiescent space, said baffle means being of form to permit free upward flow from said agitating space over substantially the whole area thereof and to permit substantially uniform rise of water over each cross-sectional area of the tank from adjacent said agitating space to adjacent the level of said treated liquid discharge, agitator means in said agitator space, a solids separator having an inlet above the lower edge of said baffle means, a second solids separator, the inlet of said second separator being of a lower level than that of the first mentioned separator, and a conduit leading from the first mentioned solids separator to the second mentioned solids separator, and a discharge to waste from said second separator.

8. The apparatus of claim 2 in which the outlet conduit from the solids separating chamber leads to a point adjacent the means for introducing liquid to be treated.

9. Apparatus of the type described, comprising a treating tank, a mechanical agitator in the lower portion of said tank, baffle members positioned above said agitator, a solids separating chamber of substantially less cross-sectional area than the cross-sectional area of the tank positioned adjacent said baffles, said separating chamber having an outlet conduit leading from the lower portion thereof, an inlet into the lower portion of said tank, an outlet from the upper portion of said tank, a second solids separating chamber positioned to receive solids from another level in said tank, and an outlet from the lower portion of said second separating chamber.

10. The proces of treating water that includes separation of the water and solid particles which comprises the steps of establishing a single vertical, generally cylindrically and uniformly rising column of water undergoing treatment substantially free of obstructions which restrict vertical flow, delivering water to be treated into the lower portion of said column, accumulating in the said lower portion of said column solids from previously treated water to form a slurry, agitating the slurry in the said lower portion of said column to produce a movement having a major rotational component to maintain in suspension substantially all solids therein, stilling the rotational movement of the slurry rising out of the zone of agitation to create a region of relative quiescence in the upper portion of said column, withdrawing solids to waste from the slurry rising in a portion of said region of relative quiescence, and withdrawing treated water from said column above the level of solids withdrawal.

11. Apparatus of the type described, comprising a treating tank, a mechanical agitator having blades extending horizontally in the lower portion of said tank, spaced, horizontally extending, substantially vertical baffle members positioned above said agitator blades and dividing said tank into an upper quiescent zone and a lower agitation zone, and so constructed and arranged as to still rotary motion of liquid in said tank but to permit uniform, free and unobstructed passage between said zones, a solids separator in said tank comprising an auxiliary chamber, said chamber having an inlet positioned at a level above said agitator and below the upper portion of said quiescent zone and an outlet from the lower part of said chamber, means for introducing water to be treated into the lower portion of said tank, means to deliver treating reagent to said water, and a treated water outlet leading from the upper portion of said tank.

12. A process for treating water that includes clarification thereof, comprising the steps of confining a body of water undergoing treatment in the form of a continuous vertical column which is substantially free of obstructions which restrict vertical flow and is of symmetrical cross-section, there being included in said column an upper quiescent zone and a lower agitation zone in open and substantially unobstructed communication one with the other whereby water and solids may directly and freely pass from one zone to the other; delivering water to be treated into the agitation zone and thereby establishing an upward displacement of water in said column; delivering a precipitate forming reagent to the water entering the agitation zone; accumulating in suspension in the water in said agitation zone a substantial quantity of solids precipitating from previously treated water; imparting mechanical energy having a major horizontal component to said suspension in the lower part of said column to prevent any material deposit of solids therefrom, whereby a slurry is formed and conditioned by the combined effects of precipitation, agitation and accumulation; stilling horizontal movement of the water passing from the agitation zone to the quiescent zone without materially changing the velocity of upward displacement; limiting the accumulation of solids in said slurry by withdrawing excess solids to waste from an intermediate level in the body of slurry through a protected concentration zone; and withdrawing clarified water from the column at a level in the quiescent zone above the body of slurry.

13. A process for treating water that includes clarification thereof, comprising the steps of confining a body of water undergoing treatment in the form of a continuous vertical column which is substantially free of obstructions which restrict vertical flow and is of symmetrical cross-section, there being included in said column an upper quiescent zone and a lower agitation zone in open and substantially unobstructed communication whereby water and solids may directly and freely pass from one zone to the other; delivering water to be treated into the agitation zone and thereby causing an upward displacement of water in said column; delivering a precipitate forming reagent to the water entering the agitation zone; accumulating in suspension in the water in said agitation zone a substantial quantity of the solids precipitating from previously treated water; imparting mechanical energy having a major horizontal component to said suspension in the lower part of said column to prevent any material deposit of solids therefrom whereby a slurry is formed and conditioned by the combined effects of precipitation, agitation and accumulation; stilling horizontal movement of the water passing from the agitation zone to the quiescent zone without materially changing the velocity of upward displacement; withdrawing solids to waste from the suspension adjacent a predetermined upper level thereof through a protected concentration zone; and withdrawing clarified water from the column at a level in the quiescent zone above the body of the slurry.

14. Apparatus of the type described, comprising a treating tank substantially free of obstructions which restrict vertical flow, means for delivering liquid to be treated opening into the lower portion of said tank, means for delivering treating reagent to liquid entering to be treated, a treated liquid outlet from the upper portion of said tank, an agitator member rotatably mounted in the lower portion of said tank, a solids accumulating chamber of substantially less cross-sectional area than the cross-sectional area of the tank, said solids accumulating chamber communicating with the interior of said tank at a level intermediate the agitator member and said treated liquid outlet, whereby solids for discharge to waste are taken from liquid at said intermediate level, a discharge to waste leading from the lower part of said solids accumulating chamber, and means for stilling motion imparted to liquid in said tank by said agitator comprising substantially vertical baffles extending horizontally across the tank above the agitator member and below the treated liquid outlet.

15. In apparatus of the type described, a treating tank, a shaft extending vertically in said tank, an agitator member mounted on said shaft and extending horizontally therefrom adjacent the floor of said tank, horizontally disposed, vertically extending baffle members mounted in said tank and extending across the major portion of the cross sectional area thereof, a solids receiving chamber in said tank, said chamber being of small cross sectional area relative to the cross sectional area of the tank and having an upwardly opening inlet located above said agitator member and an outlet conduit from the lower part thereof, means for delivering liquid to be treated and a treating reagent into the lower portion of said tank, and outflow conduit means for withdrawing treated liquid from the upper part of the tank above the level of said solids receiving chamber.

16. The process of claim 13 wherein the solids are accumulated in suspension to form a slurry, having a solids content of 1% or more, by weight.

17. The process of claim 12 wherein the solids are accumulated in suspension to form a slurry having a solids content of 1% or more, by weight.

18. In apparatus of the type described, a treating tank, a shaft extending vertically in said tank, an agitator member mounted on said shaft to revolve therewith, said agitator member extending from said shaft over the floor of the tank, a solids separator chamber centrally mounted in said tank, said chamber being of substantially smaller cross-sectional area than the tank and having an upper solids inlet and an outlet conduit leading from its lower part, baffle members extending across said tank from adjacent the wall thereof to adjacent said chamber, means for delivering liquid to be treated into the lower part of said tank, means for delivering treating reagent to the liquid to be treated, an outlet for withdrawing treated liquid from the upper part of the tank and a discharge conduit leading from the lower part of the tank.

19. In a process for treating water including the steps of confining a body of water undergoing treatment in the form of a vertical column, establishing in said column an upper quiescent zone and a lower agitation zone, delivering water to be treated into the agitation zone and thereby establishing an upward displacement of water in said column, delivering precipitate forming reagent in the water entering the agitation zone, accumulating in suspension in the water in said agitation zone a substantial quantity of solids formed in and collected from previously treated water, agitating said suspension sufficiently to prevent any material deposits of solids therefrom, whereby a slurry is formed and conditioned by the combined effects of precipitation, agitation and accumulation, stilling horizontal movement of the water passing from the agitation zone to the quiescent zone and withdrawing treated water from the upper part of the quiescent zone, the improvements which comprise forming and maintaining the column of water substantially free of obstructions which restrict vertical flow whereby the upper quiescent zone and lower agitation zone are in open and unobstructed communication, one with the other, over the greater portion of the cross-sectional area of the column whereby water may rise from the agitation zone to the quiescent zone without materially altering its velocity of rise, and solids may directly and freely pass from one zone to the other, and laterally withdrawing suspended solids from a predetermined upper level of the slurry into a relatively small solids concentration zone, effecting separation of solids and liquid in such concentration zone, and discharging concentrated solids to waste from the lower part of the concentration zone.

20. In apparatus of the type described, comprising a treating tank, a mechanical agitator member in the lower portion of said tank, an inlet into the lower portion of said tank, and an outlet from the upper portion of said tank, the improvement which comprises the combination of substantially vertical baffles extending horizontally across the tank above the agitator member and below the outlet means, and a solids separating chamber of substantially less cross-sectional area than the cross-sectional area of the tank positioned adjacent said baffles, said separating chamber having an outlet conduit leading from the lower portion thereof.

WALTER H. GREEN.

CERTIFICATE OF CORRECTION.

Reissue No. 22,194. October 6, 1942.

WALTER H. GREEN.

It is hereby certified that error appears in the printed specification of the above numbered patent requiring correction as follows: Page 5, second column, line 28, claim 19, for "agent in" read --agent to--; and that the said Letters Patent should be read with this correction therein that the same may conform to the record of the case in the Patent Office.

Signed and sealed this 22nd day of December, A. D. 1942.

Henry Van Arsdale,
Acting Commissioner of Patents.

(Seal)